(12) United States Patent
Gitzel et al.

(10) Patent No.: US 12,412,261 B2
(45) Date of Patent: *Sep. 9, 2025

(54) SYSTEM FOR MONITORING A SWITCHGEAR

(71) Applicant: ABB Schweiz AG, Baden (CH)

(72) Inventors: Ralf Gitzel, Mannheim (DE); Stephan Wildermuth, Laudenbach (DE); Joerg Gebhardt, Mainz (DE); Joerg Ostrowski, Zurich (CH); Patrik Kaufmann, Baden (CH)

(73) Assignee: ABB Schweiz AG, Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,404

(22) Filed: May 19, 2023

(65) Prior Publication Data

US 2023/0289951 A1  Sep. 14, 2023

Related U.S. Application Data

(63) Continuation of application No. 17/005,326, filed on Aug. 28, 2020, now Pat. No. 11,694,320.

(30) Foreign Application Priority Data

Aug. 30, 2019  (EP) .................................... 19194696

(51) Int. Cl.
| | | |
|---|---|---|
| *G06T 7/00* | (2017.01) | |
| *H04N 7/18* | (2006.01) | |
| *H04N 23/20* | (2023.01) | |

(52) U.S. Cl.
CPC ............. *G06T 7/0004* (2013.01); *H04N 7/18* (2013.01); *H04N 23/20* (2023.01);
(Continued)

(58) Field of Classification Search
None
See application file for complete search history.

(56) References Cited

U.S. PATENT DOCUMENTS 8,599,262 B2 * 12/2013 George-Svahn .......... G01J 5/02
                                                        348/164
9,109,945 B1    8/2015 Warnke et al.
(Continued)

FOREIGN PATENT DOCUMENTS

| CN | 101806762 A | 8/2010 |
|---|---|---|
| CN | 103439342 A | 12/2013 |

(Continued)

OTHER PUBLICATIONS

Bhakhra S. "Display Processor in Computer Graphics", GeeksforGeeks. org, https://web.archive.org/web/20220520022643/https://www.geeksforgeeks.org/display-processor-in-computer-graphics/ (Year: 2019).*

(Continued)

*Primary Examiner* — Stefan Gadomski
(74) *Attorney, Agent, or Firm* — Leydig, Voit & Mayer, Ltd.

(57) ABSTRACT

A system for monitoring a switchgear includes: an infrared camera for acquiring at least one infrared image of the switchgear; a processing unit for determining a pixel in the at least one infrared image associated with a hottest temperature, determining e pixels in the at least one infrared image associated with a temperature that is within a threshold temperature of the hottest temperature, and determining that a hot spot exists in the switchgear as a determination, the determination being a utilization of the determined pixels in the at least one infrared image; and an output unit for outputting an indication of a fault in the switchgear based on the determined hot spot.

16 Claims, 3 Drawing Sheets

A

B

C

D

F

E

(52) U.S. Cl.
CPC ............ *G06T 2207/10048* (2013.01); *G06T 2207/20081* (2013.01); *G06T 2207/20084* (2013.01); *G06T 2207/30164* (2013.01)

(56) References Cited

U.S. PATENT DOCUMENTS

| | | | |
|---|---|---|---|
| 9,534,958 B1 | 1/2017 | Lhamon et al. | |
| 10,234,439 B2 | 3/2019 | Sutton | |
| 2006/0033998 A1 | 2/2006 | King | |
| 2006/0178582 A1 | 8/2006 | Sheu | |
| 2006/0249679 A1 | 11/2006 | Johnson et al. | |
| 2007/0241089 A1 | 10/2007 | Begeal et al. | |
| 2008/0099678 A1 | 5/2008 | Johnson et al. | |
| 2009/0008558 A1 | 1/2009 | Strandemar et al. | |
| 2009/0050806 A1 | 2/2009 | Schmidt et al. | |
| 2010/0127171 A1* | 5/2010 | Jonsson | H04N 23/633 250/330 |
| 2010/0265332 A1 | 10/2010 | George-Svahn et al. | |
| 2011/0074959 A1* | 3/2011 | Strandemar | G01J 5/10 340/584 |
| 2012/0031581 A1 | 2/2012 | Chillar et al. | |
| 2012/0032810 A1 | 2/2012 | Chillar et al. | |
| 2013/0250102 A1* | 9/2013 | Scanlon | H04N 5/33 348/143 |
| 2014/0204199 A1 | 7/2014 | Yamada | |
| 2015/0213317 A1 | 7/2015 | Chiang et al. | |
| 2015/0304612 A1* | 10/2015 | Richards | H04N 7/188 348/159 |
| 2016/0156880 A1* | 6/2016 | Teich | H04N 7/188 348/82 |
| 2016/0320085 A1 | 11/2016 | Silawan et al. | |
| 2017/0004699 A1 | 1/2017 | Rizvi et al. | |
| 2017/0208261 A1 | 7/2017 | Kobayashi | |
| 2018/0283954 A1 | 10/2018 | Patel | |
| 2019/0310137 A1 | 10/2019 | Pop | |
| 2019/0313914 A1 | 10/2019 | Kirenko et al. | |
| 2019/0385443 A1 | 12/2019 | Hur | |
| 2020/0275011 A1 | 8/2020 | Casey et al. | |

FOREIGN PATENT DOCUMENTS

| | | |
|---|---|---|
| CN | 107229548 A | 10/2017 |
| CN | 107607207 A | 1/2018 |
| CN | 108254077 A | 7/2018 |
| EP | 1811771 A1 | 7/2007 |
| WO | WO 2013/073387 A1 | 5/2013 |
| WO | WO 2019/125820 A1 | 6/2019 |

OTHER PUBLICATIONS

National Communications System Office of Technology & Standards, "Telecommunications: Glossary of Telecommunication Terms ", Federal Standard 1037B, p. 19 (Year: 1991).*

Wikipedia contributors. (Jul. 27, 2019). Processor (computing). In Wikipedia, The Free Encyclopedia. Retrieved 01:59, May 2, 2025 , from https://web.archive.org/web/20190727174641/https://en.wikipedia.org/wiki/Processor_(computing) (Year: 2019).*

Jadin et al., "Feature extraction and classification for detecting the thermal faults in electrical installations," *Measurement*, 57: 15-24 (Nov. 2014).

Lin et al., "Deep Learning for Intelligent Substation Device Infrared Fault Image Analysis," *MATEC Web of Conferences*, 55: 6 pp. (Apr. 25, 2016).

Yan et al., "A Real-Time IR-Fusion Switchgear Contact Monitoring System (SCMS)," *IEEE Access*, 5: 12114-12124 (Jul. 17, 2017).

Jia et al., "Infrared Faults Recognition for Electrical Equipments Based on Dual Supervision Signals Deep Learning," *Infrared and Laser Engineering*, 47(7): 7 pp. (Jul. 2018).

Ye et al., "Online Detection Technology of Solid Insulation RMU Based on Infrared Thermal Imaging," *Electric Power*, 49(9): 35-40 (Sep. 5, 2016).

U.S. Appl. No. 17/005,326, filed Aug. 28, 2020.

* cited by examiner

SYSTEM FOR MONITORING A SWITCHGEAR

CROSS-REFERENCE TO PRIOR APPLICATION

This patent application is a continuation of copending U.S. patent application Ser. No. 17/005,326, filed Aug. 28, 2020, which claims priority to European Patent Application No. 19194696.1, filed on Aug. 30, 2019, the entire disclosures of which are hereby incorporated by reference herein in their entireties.

FIELD

The present invention relates to a system for monitoring a switchgear.

BACKGROUND

Infrared (IR) images can be used to identify technical problems within electrical equipment (e.g. switchgear) that leads to overheating of components. However, while a human is quite capable of recognizing hot spots, automated systems require specific configurations to be able properly to recognize the problems. A typical approach is to identify a region of interest for each phase. These regions can then be compared. If one is significantly hotter than the others, a fault has occurred.

There are several drawbacks to this approach. First of all, the phases have to be identified in the IR image manually for each model and rating of switchgear. This is a time consuming, expensive and error-prone process as the exact position of the phases in the IR image depend on many switchgear specific parameters (panel size, current rating, internal structure) as well as camera specific parameters (field of view, resolution, and manufacturing tolerances of optics). Second, any hot activity outside the defined region of interest will be ignored, so any mistakes reduce the efficiency of the algorithm, and any developing problem in a different component will not be detected. Thirdly, a modification of the switchgear during a service task in the field may influence the identification of phases in the IR image, and/or any movement or change in alignment of the camera's field of view leads to a change of the position of the regions and to incorrect operation.

There is a need to address these issues.

SUMMARY

In an embodiment, the present invention provides a system for monitoring a switchgear, the system comprising: an infrared camera configured to acquire at least one infrared image of the switchgear; a processing unit configured to determine a pixel in the at least one infrared image associated with a hottest temperature, to determine pixels in the at least one infrared image associated with a temperature that is within a threshold temperature of the hottest temperature, and to determine that a hot spot exists in the switchgear as a determination, the determination comprising a utilization of the determined pixels in the at least one infrared image; and an output unit configured to output an indication of a fault in the switchgear based on the determined hot spot.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an improved system for processing the IR image of electrical equipment to actionable information.

It is to be noted that the system is described with respect to a switchgear, but finds utility in other electrical system than can suffer from components that overheat.

Figure 4:
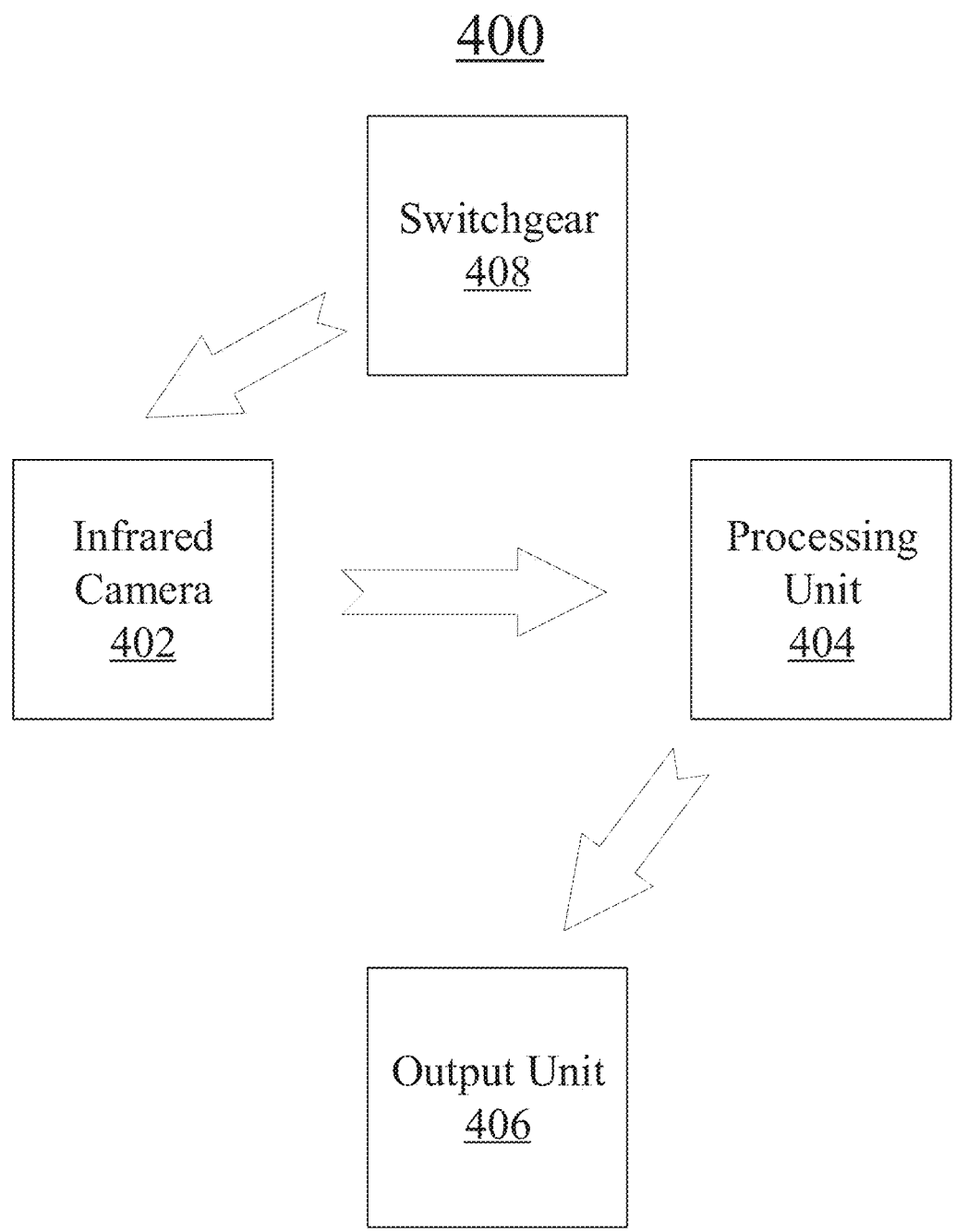
FIG. 4 is a simplified block diagram depicting an exemplary system for monitoring an a switchgear, in accordance with an embodiment of the present disclosure.

In an aspect, FIG. 4 provides a system 400 for monitoring a switchgear 408. The system comprises:

an infrared camera 402;
a processing unit 404; and
an output unit 406.

The infrared camera 402 is configured to acquire at least one infrared image of the switchgear 408. The processing unit 404 is configured to determine a pixel in the at least one infrared image associated with a hottest temperature. The processing unit 404 is configured to determine pixels in the at least one infrared image associated with a temperature that is within a threshold temperature of the hottest temperature. The processing unit 404 is configured to determine that a hot spot exists in the switchgear 408, the determination comprising utilization of the determined pixels in the at least one infrared image. The output unit 406 is configured to output an indication of a fault in the switchgear 408 on the basis of the determined hot spot.

In this way, knowledge of the structure of the switchgear and identification of those areas that could suffer from hot spots is not required, rather a determination of any regions that are hot is made. The shape, size, position, and number of the hot regions and how they are or are not joined can be used to determine if there is a hot spot indicative of a fault.

It is to be noted that an infrared image also means a thermogram, with arrays of numbers representing temperatures measured by each pixel of the camera.

In an example, the threshold temperature is a fixed temperature range.

In an example, the at least one image comprises a first infrared image and a second infrared image acquired after the first infrared image. The processing unit is configured to determine a pixel in the first infrared image associated with a hottest temperature of the first infrared image and determine a pixel in the second infrared image associated with a hottest temperature of the second infrared image. The processing unit is configured to determine pixels in the first infrared image associated with a temperature that is within the threshold temperature of the hottest temperature in the first infrared image and determine pixels in the second infrared image associated with a temperature that is within the threshold temperature of the hottest temperature in the second infrared image. The processing unit is configured to determine that the hot spot exists in the switchgear comprising a comparison of the determined pixels in the first infrared image with the determines pixels in the second infrared image.

Thus, for example a change in size of the hottest region can indicate a fault. As a part becomes hotter it has been found that the size of the region within a set temperature range of the hottest pixel can actually become smaller, and this reduction in size can be used to determine that a fault has developed. Also, a number of separate hot spot regions in a first image can be indicative of a number of similar or same components operating normally where they are heating up due to Joule heating. However, if one component develops a fault and becomes hot the hottest temperature range can then be centred around only the hottest part of that component, and the hot regions of the other components are then outside of this threshold range. Thus, a reduction in the number of separate regions from an image to a subsequent image can be used to indicate that the region in the subsequent image has a fault. A change in shape if the hot region can also be used to indicate that there is now a fault.

In an example, the determination that the hot spot exists comprises an analysis of one or more of: a shape of at least one region within the determined pixels in the at least one infrared image; a size of the at least one region within the determined pixels in the at least one infrared image; a position of the at least one region within the determined pixels in the at least one infrared image; a number of the at least one region within the determined pixels in the at least one infrared image; a number of pixels within the determined pixels in the at least one infrared image.

In an example, the determination that the hot spot exists comprises a determination that a region in the second infrared image is smaller than a corresponding region in the first infrared image.

In an example, the determination that the hot spot exists comprises a determination that a number of regions in the second infrared image is smaller than a number of regions in the first infrared image.

In an example, the determination that the hot spot exists comprises a determination that the number of regions in the second image is one.

In an example, the switchgear comprises two or more components of the same type that are loaded with substantially the same current. The determination that the hot spot exists comprises a determination of one or more of: a shape of a first region within the determined pixels in the at least one infrared image is different to a shape of a second region within the determined pixels in the at least one infrared image; a size of a first region within the determined pixels in the at least one infrared image is different to a size of a second region within the determined pixels in the at least one infrared image; a position a region within the determined pixels in the at least one infrared image is not associated with a position of the two or more components; a number of the at least one region within the determined pixels in the at least one infrared image is less than a number of the two or more components.

In other words, when it is knows that there are for example three current carrying components, such as the three poles of 3-phase circuit breakers, that should equally be hot, then normally there should be three separate hot regions within the threshold temperature range of the hottest pixel. However, when one of these components develops a fault and becomes hot, then when the threshold temperature range is correctly selected then the maximum temperatures of the other components sit outside of the maximum temperatures (within the temperature range of the hottest temperature) of the faulty component. A consequence is that there is only one region of temperature within the hottest temperatures, rather than three in this example, and this can be used to determine that the component that has this hottest temperature has a fault.

In an example, the determination that the hot spot exists comprises a determination that there is only one region within the determined pixels in the at least one infrared image.

In an example, the determination that the hot spot exists comprises a generation of at least one binary image. The determined pixels in the at least one infrared image are given a different binary value to the remaining pixels in the at least one infrared image.

In this manner, a binary image can facilitate processing by a machine learning algorithm for example.

In an example, the determination that the hot spot exists comprises utilization of a machine learning algorithm.

In an example, the machine learning algorithm is a trained neural network.

In an example, the system comprises a visible camera configured to acquire a visible image of the switchgear. The processing unit is configured to overlay the determined pixels in the at least one infrared image onto corresponding at least one location in the visible image.

In other words, the location of hot pixels can be mapped to a visible image in order to allow a human to review the situation to determine if there is a fault.

In an example, the at least one image comprises a plurality of images acquired at different times. The processing unit is configured to determine a pixel in each of the plurality of infrared images associated with a hottest temperature in each of the plurality of infrared images. The processing unit is configured to determine a number of threshold pixels in each of the plurality of infrared images associated with a temperature that is within the threshold temperature of the hottest temperature in each of the plurality of infrared images. The determination that the hot spot exists comprises a determination of a rate of change of the number of threshold pixels with time.

In an example, the determination that the hot spot exists comprises a comparison of the rate of change of the number of threshold pixels with time against a baseline rate of change of the number of threshold pixels with time.

The above aspects and examples will become apparent from and be elucidated with reference to the embodiments described hereinafter.

Figure 1:
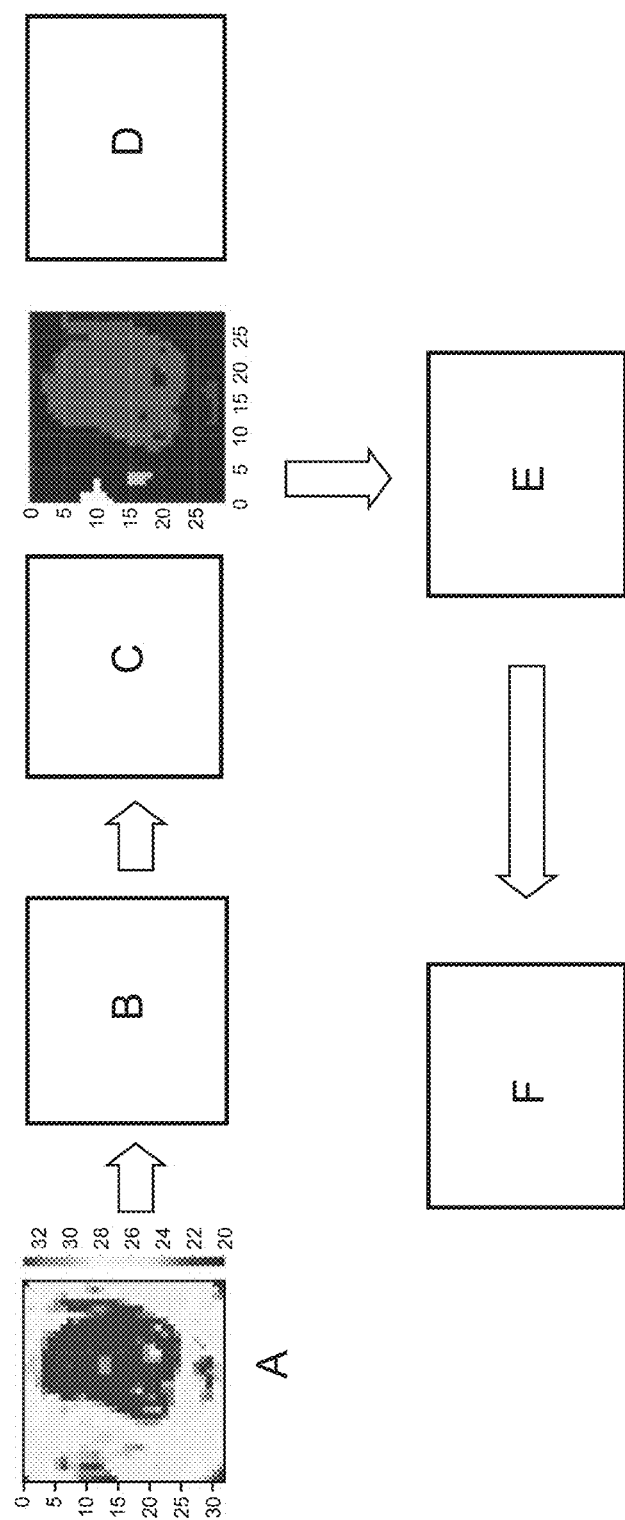
FIG. 1 shows a detailed workflow relating to an example of the processing undertaken to determine a fault in a switchgear.
Figure 2:
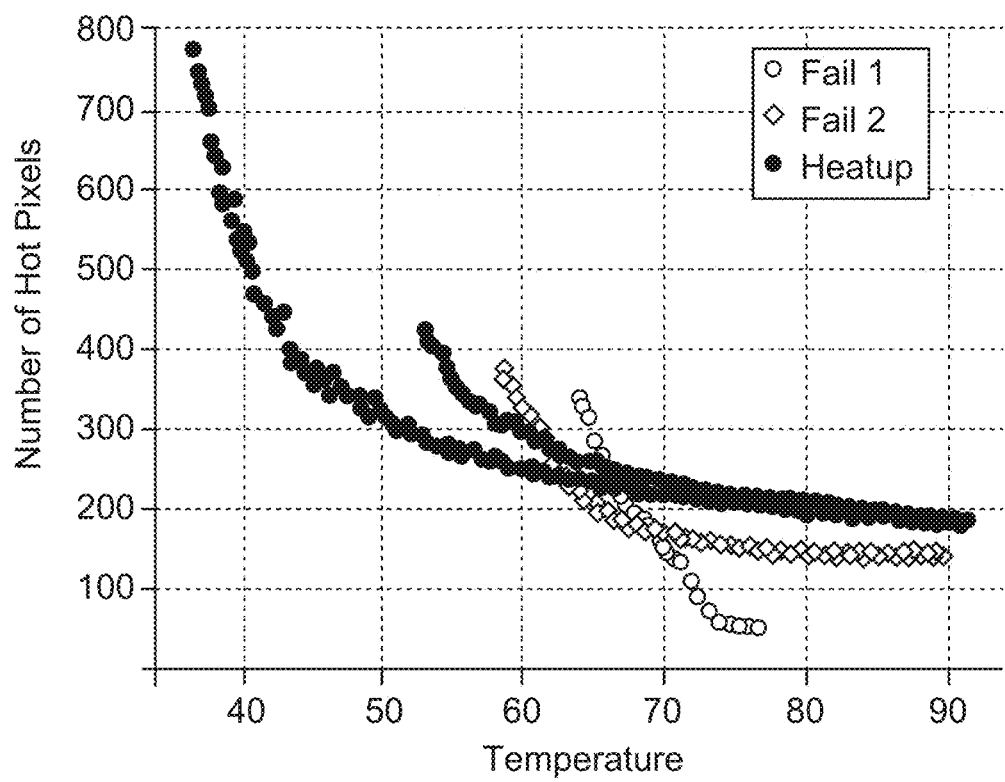
FIG. 2 shows the number of pixels in an image for examples of normal and faulty situations.
Figure 3:
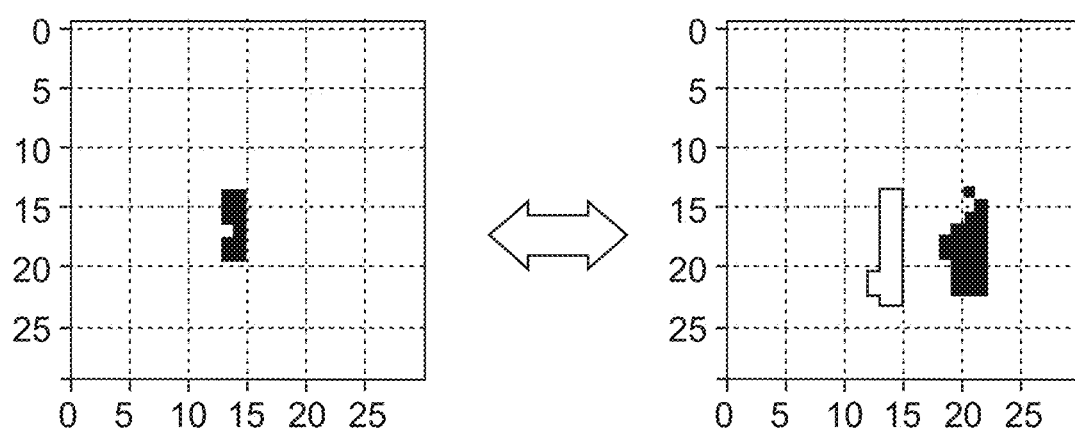
FIG. 3 shows can example of the maximum temperatures for a normal situation with two normally operating components on the right and shows on the left the processed image when the left hand component has suffered a fault.

FIGS. 1-3 relate to a system for monitoring a switchgear. In an example, the system comprises an infrared camera, a processing unit, and an output unit. The infrared camera is configured to acquire at least one infrared image of the switchgear. The processing unit is configured also to determine a pixel in the at least one infrared image associated with a hottest temperature. The processing unit is configured also to determine pixels in the at least one infrared image associated with a temperature that is within a threshold temperature of the hottest temperature. The processing unit is configured also to determine that a hot spot exists in the switchgear, the determination comprising utilization of the determined pixels in the at least one infrared image. The output unit is configured to output an indication of a fault in the switchgear on the basis of the determined hot spot.

In an example, the indication of the fault in the switchgear on the basis of the determined hot spot comprises an output of an image of the hot spot.

In an example, the indication of the fault in the switchgear on the basis of the determined hot spot comprises an output of an image of the hot spot identified within the at least one infrared image.

In an example, the indication of the fault in the switchgear on the basis of the determined hot spot comprises an output of an alarm signal.

According to an example, the threshold temperature is a fixed temperature range.

In an example, the fixed temperature range can be a fixed number of degrees Celsius.

In an example, the fixed temperature range can be or a percentage of the current average temperature of the image.

In an example, the fixed temperature range can be a percentage of the maximum temperature of the image.

In an example, the fixed temperature range can be a dynamically changing value in degrees Celsius depending on the average or maximum temperature of the image.

In an example, the fixed temperature range of the threshold is 5° C. In an example, the fixed temperature range of the threshold is 7° C. In an example, the fixed temperature range of the threshold is 10° C. In an example, the fixed temperature range of the threshold is 15° C. In an example, the fixed temperature range of the threshold is 20° C. Thus, for example, when the threshold temperature is 7° C., then for a hottest temperature in the infrared image of 100° C., then all pixels having a temperature of greater than 93° C. are identified.

According to an example, the at least one image comprises a first infrared image and a second infrared image acquired after the first infrared image. The processing unit is configured to determine a pixel in the first infrared image associated with a hottest temperature of the first infrared image and determine a pixel in the second infrared image associated with a hottest temperature of the second infrared image. The processing unit is configured also to determine pixels in the first infrared image associated with a temperature that is within the threshold temperature of the hottest temperature in the first infrared image and determine pixels in the second infrared image associated with a temperature that is within the threshold temperature of the hottest temperature in the second infrared image. The processing unit is configured also to determine that the hot spot exists in the switchgear comprising a comparison of the determined pixels in the first infrared image with the determines pixels in the second infrared image.

According to an example, the determination that the hot spot exists comprises an analysis of one or more of: a shape of at least one region within the determined pixels in the at least one infrared image; a size of the at least one region within the determined pixels in the at least one infrared image; a position of the at least one region within the determined pixels in the at least one infrared image; a number of the at least one region within the determined pixels in the at least one infrared image; a number of pixels within the determined pixels in the at least one infrared image.

According to an example, the determination that the hot spot exists comprises a determination that a region in the second infrared image is smaller than a corresponding region in the first infrared image.

According to an example, the determination that the hot spot exists comprises a determination that a number of regions in the second infrared image is smaller than a number of regions in the first infrared image.

According to an example, the determination that the hot spot exists comprises a determination that the number of regions in the second image is one.

According to an example, the switchgear comprises two or more components of the same type that are loaded with substantially the same current. The determination that the hot spot exists can then comprise a determination of one or more of: a shape of a first region within the determined pixels in the at least one infrared image is different to a shape of a second region within the determined pixels in the at least one infrared image; a size of a first region within the determined pixels in the at least one infrared image is different to a size of a second region within the determined pixels in the at least one infrared image; a position a region within the determined pixels in the at least one infrared image is not associated with a position of the two or more components; a number of the at least one region within the determined pixels in the at least one infrared image is less than a number of the two or more components.

According to an example, the determination that the hot spot exists can comprise a determination that there is only one region within the determined pixels in the at least one infrared image.

According to an example, the determination that the hot spot exists can comprise a generation of at least one binary image. The determined pixels in the at least one infrared image are given a different binary value to the remaining pixels in the at least one infrared image. Thus for example hot pixels can be give the value 1, and all other pixels given the value 0, or vice versa.

According to an example, the determination that the hot spot exists comprises utilization of a machine learning algorithm.

According to an example, the machine learning algorithm is a trained neural network.

According to an example, the system comprises a visible camera configured to acquire a visible image of the switchgear. The processing unit is configured to overlay the determined pixels in the at least one infrared image onto corresponding at least one location in the visible image.

According to an example, the at least one image comprises a plurality of images acquired at different times. The processing unit is configured to determine a pixel in each of the plurality of infrared images associated with a hottest temperature in each of the plurality of infrared images. The processing unit is configured to determine a number of threshold pixels in each of the plurality of infrared images associated with a temperature that is within the threshold temperature of the hottest temperature in each of the plurality of infrared images. The determination that the hot spot exists comprises a determination of a rate of change of the number of threshold pixels with time.

According to an example, the determination that the hot spot exists comprises a comparison of the rate of change of the number of threshold pixels with time against a baseline rate of change of the number of threshold pixels with time.

Thus, a switchgear or other electrical equipment can have installed in association with it the above described system.

Thus, the system takes the hottest temperature of one image and identifies all pixels within the hottest x degrees. Anything below or above a certain pixel count or number of connected regions for a certain temperature can be considered a fault. The location of the pixels can be mapped to a visual-light image to tell a human were the fault is or mapped to a binarized image (where all hot pixels are black and the rest of the image is white) for further processing by machine learning. Thus, in effect the newly developed system turns the original fault detection technique "on its head". Instead of identifying regions and checking whether they are hot, it is determined which regions are hot and then these regions are analyzed with respect to their shape, size, number and position and even if whether they newly appear to identify the fault. This way, empirical results can be obtained and used to define thresholds or to use as input for machine learning.

Continuing with the figures, the system for monitoring a switchgear is described in further detail, with respect to specific embodiments.

FIG. 1 shows a detailed workflow relating to an example of the processing undertaken to determine a fault in a switchgear. As shown at "A" an IR image of a switchgear is acquired by an infrared camera. A pre-processing step can be used to increase the image quality. This can involve noise suppression, compensation of optical effects, removal of edges, etc. At "B" the hottest temperature point within the image is acquired or identified, for example 35° C. There could be several pixels that have exactly the same highest temperature and either or both can be selected. Then at "C" all the pixels in the image that are within a threshold temperature range of the highest temperature are selected. For example, if the threshold temperature range is 7° C., then all pixels between 28° C. and 35° C. are selected. Thus, the threshold value is used to compute a range of values which are considered hot in this particular case. The threshold is the maximum temperature minus a specific value. This value can be a fixed number of degrees Celsius or a percentage of the current average temperature of the image, or a percentage of the maximum temperature of the image or a dynamically changing value in degrees Celsius depending on the average or maximum temperature of the image. Thus, the threshold can account for the influence of the ambient air temperature (inside the compartment and/or outside of the switchgear) as well as take into account any influence of compartment type. The result is shown at in the following image. Optionally, at "D" regions that are connected are identified. At "E" the pixel count, number of regions, shape, and/or size of individual regions is analysed to decide whether this is a fault or not. If a fault is determined at "F" the pixel map is overlaid on a visual light image of the switchgear, for example of the switchgear compartment, to identify the position of the fault and/or to define which regions belong to which phase of a three-phase system.

Thus, the threshold is used to identify all camera pixels which are hotter than the threshold value. Images with a very strong hotspot will exhibit rather a small area. If there is no hotspot, the area is wide or broad, and in ideal cases even showing the different components of interest as distinct unconnected regions.

The original IR image can be transformed to a new, binary image, consisting of only two colors (for example black and white), where one color (e.g. black) are the pixels above the threshold (the hot pixels) and other color (e.g. white) are the pixels below the threshold (the cold pixels). In general, this transformation can result in a mask for further processing of the IR image, for example by a machine learning algorithm such as a trained neural network.

A very simple approach is to count the number of hot pixels, which is shown in FIG. 2. As shown in this figures, cases with a strong fault will show a sharp decline in the number of hot pixels as the temperature increases in time. The number of pixels used for determining a hot spot situation can be derived for each scene by counting the pixels belonging to one component of interest. If the number of hot pixels drops below this value, the image is showing a hot spot. The number of pixels used for determining a hot spot situation can be also determined by experiments or simulations or via machine learning algorithms. Thus, the number of pixels of a hot region, compared to a baseline for a component can be used to indicate if there is a fault, and also the temporal change in the number of pixels within the threshold region can also be used, when compared against such a baseline, to indicate that the component is abnormally hot and that there is a fault.

To catch more subtle faults, additional properties can be examined. For example, by taking the numbers and respective sizes of distinct regions, it is possible to detect even less obvious hot spots. In the FIG. 3, the disappearance of one of the two phases shows that there is a problem, this is because the phase that is faulty is hot enough such that it hottest temperate is great than the hottest temperature of the other phase by at least the threshold temperature range.

The image (for example a transformed binary image) can be further processed by machine learning. The machine learning model can be trained with typical patterns showing layout of hot pixels for images without hot spot, layout of hot pixels for images with a hot spot on a first specific component layout of hot pixels for images with a hot spot on a second component and so forth. The image can be fed to the model and the model will classify it as "no hot spot", "hot spot on the first component or the second component for example. The training data can be easily created for each new scene. A subject matter expert can recognize components on the IR or visual camera image and create typical patterns of black and white images that would be expected for healthy images, and images where different components have faults. The training data can be created from the office, without the need of expensive and time consuming experiments or simulations. The IR image discussed above can be composed of several individual images or sections of individual images, e.g. from different cameras in one panel or line-up or from different time steps.

The skilled person would appreciate that rather than looking at the hottest temperature and those pixels within a threshold range, the coldest pixels could be identified. Additionally, temperatures need not be considered linearly and for example a logarithmic scale can be utilized or the temperatures normalization or other functions applied. Temperatures can also be represented as image, grayscale image, matrix, multiple time series etc.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A system for monitoring a switchgear, the system comprising:
   a processing unit configured to:
   acquire at least one infrared image of the switchgear, wherein the at least one image comprises a first infrared image and a second infrared image acquired after the first infrared image;
   determine a pixel in the at least one infrared image associated with a hottest temperature, wherein the processing unit is further configured to determine a pixel in the first infrared image associated with a hottest temperature of the first infrared image and determine a pixel in the second infrared image associated with a hottest temperature of the second infrared image;
   determine pixels in the at least one infrared image associated with a temperature that is within a threshold temperature of the hottest temperature, wherein the processing unit is further configured to determine pixels in the first infrared image associated with a temperature that is within the threshold temperature of the hottest temperature in the first infrared image and determine pixels in the second infrared image associated with a temperature that is within the threshold temperature of the hottest temperature in the second infrared image;
   determine that a hot spot exists in the switchgear as a determination, the determination comprising a utilization of the determined pixels in the at least one infrared image, wherein the processing unit is further configured to determine that the hot spot exists in the switchgear based on a comparison of the determined pixels in the first infrared image with the determined pixels in the second infrared image; and
   an output unit configured to output an indication of a fault in the switchgear based on the determined hot spot.

2. The system according to claim 1, wherein the threshold temperature comprises a fixed temperature range.

3. The system according to claim 1, wherein determining that the hot spot exists comprises an analysis of one or more of:
   a shape of at least one region within the determined pixels in the at least one infrared image,
   a size of the at least one region within the determined pixels in the at least one infrared image,
   a position of the at least one region within the determined pixels in the at least one infrared image,
   a number of the at least one region within the determined pixels in the at least one infrared image,
   a number of pixels within the determined pixels in the at least one infrared image.

4. The system according to claim 3, wherein determining that the hot spot exists comprises determining that a region in the second infrared image is smaller than a corresponding region in the first infrared image.

5. The system according to claim 3, wherein determining that the hot spot exists comprises determining that a number of regions in the second infrared image is smaller than a number of regions in the first infrared image.

6. The system according to claim 5, wherein determining that the hot spot exists comprises determining that the number of regions in the second image is one.

7. The system according to claim 3, wherein the switchgear comprises two or more components of a same type that are loaded with substantially a same current, wherein determining that the hot spot exists comprises determining of one or more of:
   a shape of a first region within the determined pixels in the at least one infrared image is different than a shape of a second region within the determined pixels in the at least one infrared image,
   a size of a first region within the determined pixels in the at least one infrared image is different than a size of a second region within the determined pixels in the at least one infrared image,
   a position within the determined pixels in the at least one infrared image is not associated with a position of the two or more components,
   a number of the at least one region within the determined pixels in the at least one infrared image is less than a number of the two or more components.

8. The system according to claim 7, wherein determining that the hot spot exists comprises determining that there is only one region within the determined pixels in the at least one infrared image.

9. The system according to claim 1, wherein determining that the hot spot exists comprises generating of at least one binary image, and wherein the determined pixels in the at least one infrared image are given a different binary value than remaining pixels in the at least one infrared image.

10. The system according to claim 1, wherein determining that the hot spot exists comprises a utilization of a machine learning algorithm.

11. The system according to claim 10, wherein the machine learning algorithm comprises a trained neural network.

12. The system according to claim 1, wherein the processing unit is further configured to:
    acquire a visible image of the switchgear, and
    overlay the determined pixels in the at least one infrared image onto a corresponding at least one location in the visible image.

13. The system according to claim 1, wherein the at least one image comprises a plurality of infrared images acquired at different times, and wherein the processing unit is further configured to:
    determine a pixel in each of the plurality of infrared images associated with a hottest temperature in each of the plurality of infrared images,
    determine pixels in each of the plurality of infrared images associated with a temperature that is within the threshold temperature of the hottest temperature in each of the plurality of infrared images and calculate a number of determined pixels in each of the plurality of infrared images, and
    wherein the determination that the hot spot exists comprises a determination of a rate of change of the number of determined pixels with time.

14. The system according to claim 13, wherein the determination that the hot spot exists comprises a comparison of the rate of change of the number of determined pixels with time against a baseline rate of change of the number of determined pixels with time.

15. A system for monitoring a switchgear, the system comprising a processing unit configured to:
acquire at least one infrared image of the switchgear, wherein the at least one image comprises a first infrared image and a second infrared image acquired after the first infrared image;
determine a pixel in the at least one infrared image associated with a hottest temperature, wherein determining the pixel further comprises determining a pixel in the first infrared image associated with a hottest temperature of the first infrared image and determining a pixel in the second infrared image associated with a hottest temperature of the second infrared image;
determine pixels in the at least one infrared image associated with a temperature that is within a threshold temperature of the hottest temperature, wherein determining the pixels further comprises determining pixels in the first infrared image associated with a temperature that is within the threshold temperature of the hottest temperature in the first infrared image and determining pixels in the second infrared image associated with a temperature that is within the threshold temperature of the hottest temperature in the second infrared image;
determine that a hot spot exists in the switchgear as a determination, the determination comprising a utilization of the determined pixels in the at least one infrared image, wherein determining that the hot spot exists further comprises determining that the hot spot exists in the switchgear based on a comparison of the determined pixels in the first infrared image with the determined pixels in the second infrared image, and wherein determining that the hot spot exists comprises an analysis of one or more of:
a shape of at least one region within the determined pixels in the at least one infrared image;
a size of the at least one region within the determined pixels in the at least one infrared image;
a position of the at least one region within the determined pixels in the at least one infrared image;
a number of the at least one region within the determined pixels in the at least one infrared image;
a number of pixels within the determined pixels in the at least one infrared image;
wherein determining that the hot spot exists comprises determining that a region in the second infrared image is smaller than a corresponding region in the first infrared image; and
an output unit configured to output an indication of a fault in the switchgear based on the determined hot spot.

16. A system for monitoring a switchgear, the system comprising a processing unit configured to:
acquire at least one infrared image of the switchgear, wherein the at least one image comprises a first infrared image and a second infrared image acquired after the first infrared image;
determine a pixel in the at least one infrared image associated with a hottest temperature, wherein the processing unit is further configured to determine a pixel in the first infrared image associated with a hottest temperature of the first infrared image and determine a pixel in the second infrared image associated with a hottest temperature of the second infrared image;
determine pixels in the at least one infrared image associated with a temperature that is within a threshold temperature of the hottest temperature, wherein the processing unit is further configured to determine pixels in the first infrared image associated with a temperature that is within the threshold temperature of the hottest temperature in the first infrared image and determine pixels in the second infrared image associated with a temperature that is within the threshold temperature of the hottest temperature in the second infrared image;
determine that a hot spot exists in the switchgear as a determination, the determination comprising a utilization of the determined pixels in the at least one infrared image, wherein the processing unit is further configured to determine that the hot spot exists in the switchgear based on a comparison of the determined pixels in the first infrared image with the determined pixels in the second infrared image; and
an output unit configured to output an indication of a fault in the switchgear based on the determined hot spot.

\* \* \* \* \*